(12) United States Patent
Marttila

(10) Patent No.: US 10,053,201 B2
(45) Date of Patent: Aug. 21, 2018

(54) METHOD AND APPARATUS IN AN ELECTRIC PROPULSION ARRANGEMENT OF A SAILING VESSEL

(71) Applicant: SERVOPROP OY, Tähtelä (FI)

(72) Inventor: Kari Marttila, Espoo (FI)

(73) Assignee: SERVOPROP OY, Tähtelä (FI)

( * ) Notice: Subject to any disclaimer, the term of this patent is extended or adjusted under 35 U.S.C. 154(b) by 0 days.

(21) Appl. No.: 15/503,497

(22) PCT Filed: Aug. 7, 2015

(86) PCT No.: PCT/FI2015/050519
§ 371 (c)(1),
(2) Date: Feb. 13, 2017

(87) PCT Pub. No.: WO2016/024042
PCT Pub. Date: Feb. 18, 2016

(65) Prior Publication Data
US 2017/0240261 A1    Aug. 24, 2017

(30) Foreign Application Priority Data
Aug. 14, 2014    (FI) .................................... 20145721

(51) Int. Cl.
*B60L 11/00* (2006.01)
*B63H 21/17* (2006.01)
(Continued)

(52) U.S. Cl.
CPC ............... *B63H 21/17* (2013.01); *B63H 3/02* (2013.01); *B63H 3/10* (2013.01); *B63H 23/06* (2013.01);
(Continued)

(58) Field of Classification Search
CPC ... B63H 3/00; B63H 3/02; B63H 3/04; B63H 3/06; B63H 3/10; B63H 3/12;
(Continued)

(56) References Cited

U.S. PATENT DOCUMENTS 2,850,106 A * 9/1958 Swan ...................... B63H 3/04
416/163
2,931,443 A * 4/1960 Pehrsson ................ B63H 3/082
416/157 R
(Continued)

FOREIGN PATENT DOCUMENTS

| | | |
|---|---|---|
| GB | 2 168 435 A | 6/1986 |
| WO | WO 99/67128 A1 | 12/1999 |
| WO | WO 2005/012078 A1 | 2/2005 |

*Primary Examiner* — Daniel V Venne
(74) *Attorney, Agent, or Firm* — Birch, Stewart, Kolasch & Birch, LLP

(57) ABSTRACT

The object of the invention is a method and an apparatus in an electric propulsion arrangement of a sailing vessel, wherein the sailing vessel has a traction device provided with an electric motor and with a propeller mechanism, the electric motor of traction device is arranged to be used, if necessary, in forward drive and reverse drive as well as during sailing as a generator for charging the accumulators of the sailing vessel. The propeller mechanism comprises a propeller hub with blades, a hollow propeller shaft fixed at its first end to the propeller hub, a shaft controlling the pitch angles of the propeller blades, said control shaft rotating inside the propeller shaft, and a servomotor rotating the control shaft. The servomotor is fixed to the second end of the propeller shaft to be rotatable along with the propeller shaft.

20 Claims, 4 Drawing Sheets

Figure 1:
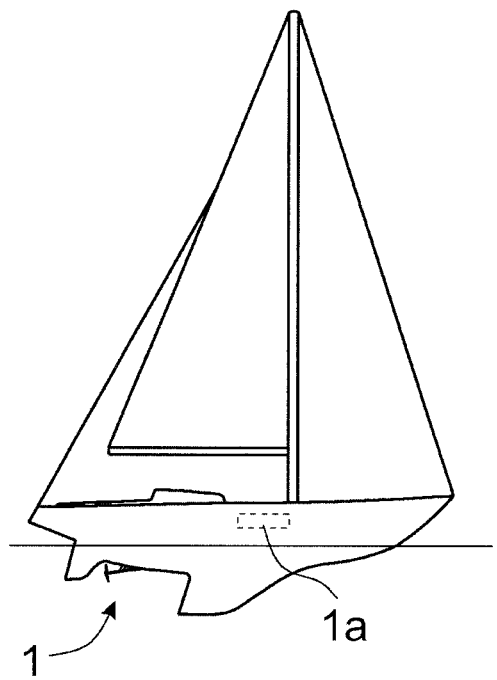

(51) Int. Cl.
*B63H 3/02* (2006.01)
*B63H 23/08* (2006.01)
*B63H 3/10* (2006.01)
*B63H 23/06* (2006.01)
*H02P 9/00* (2006.01)
*H02P 6/30* (2016.01)
*H02K 7/18* (2006.01)
*H02K 7/14* (2006.01)
*H02K 11/21* (2016.01)
*B63B 35/00* (2006.01)
*B63H 3/00* (2006.01)

(52) U.S. Cl.
CPC .............. *B63H 23/08* (2013.01); *H02K 7/14* (2013.01); *H02K 7/1823* (2013.01); *H02K 11/21* (2016.01); *H02P 6/30* (2016.02); *H02P 9/009* (2013.01); *B63B 2035/009* (2013.01); *B63B 2755/00* (2013.01); *B63H 2003/006* (2013.01)

(58) Field of Classification Search
CPC .......... B63H 2003/00; B63H 2003/004; B63H 2003/006; B63H 2003/06; B63H 21/17; B63H 2021/17; B63H 23/06; B63H 2023/06; B63H 23/08; B63B 2035/009; B63B 2755/00; H02P 9/009; H02P 6/30; H02K 7/14; H02K 7/1823; H02K 11/21

USPC ..................................... 440/6, 49, 50, 79, 83
See application file for complete search history.

(56) References Cited

U.S. PATENT DOCUMENTS

| | | | | |
|---|---|---|---|---|
| 2,955,659 | A * | 10/1960 | Daley | B63H 3/008 416/134 R |
| 3,145,780 | A * | 8/1964 | Kean | B63H 3/008 416/43 |
| 3,231,023 | A * | 1/1966 | Marshall | B63H 3/008 416/43 |
| 4,753,572 | A * | 6/1988 | Kusiak | B64C 11/30 416/153 |
| 5,326,223 | A * | 7/1994 | Speer | B63H 3/008 416/136 |
| 5,554,003 | A * | 9/1996 | Hall | B63H 3/008 416/131 |
| 6,352,410 | B1 * | 3/2002 | Muller | B63H 1/26 416/207 |
| 2010/0209244 | A1 * | 8/2010 | Lacy | B63H 3/06 416/1 |
| 2017/0240261 | A1 * | 8/2017 | Marttila | B63H 21/17 |

* cited by examiner

METHOD AND APPARATUS IN AN ELECTRIC PROPULSION ARRANGEMENT OF A SAILING VESSEL

The object of the present invention is a method, as defined in the preamble of claim 1, and an apparatus, as defined in the preamble of claim 5, in an electric propulsion arrangement of a sailing vessel.

The method and apparatus, according to the invention, in an electric propulsion arrangement of a sailing vessel, which are designated more briefly as the solution according to the invention, is particularly well suited for use e.g. as a solution charging the accumulators of a sailing vessel in a kinetic energy recovery arrangement for sailing boats or sailing ships, hereinafter jointly referred to as sailing vessels. In this case the electric motor of the traction device of a sailing vessel is used as a generator recovering kinetic energy via a propeller. When suitably regulated, a sailing vessel can function for long periods of time fully self-sufficiently, receiving the electrical energy it needs for recharging accumulators via the electric motor of the traction device when moving by means of the sails.

Known in the art are electric propulsion arrangements for a sailing vessel, in which the kinetic energy obtained by means of the sails of the sailing vessel is utilized by means of the electric motor of the traction device by using the electric motor as a generator when the propeller is rotating from the force of the movement of the sailing vessel to charge the accumulators of the electric motor. One problem is, however, that in those types of traction devices in which fixed-blade propellers are used the kinetic energy of the sailing vessel is not sufficiently well recovered, and the accumulators of the sailing vessel are thus not charged sufficiently fully during a sailing journey of normal duration. The reason for this is that fixed-blade propellers certainly convey a vessel forwards with an adequately high efficiency ratio, but in a charging situation with the flow coming to the propeller from the other side than the intended one, the geometry of the blades of a fixed-blade propeller is such that the efficiency ratio from the viewpoint of recovered kinetic energy is extremely bad. In this case separate additional generators or solar panels must be used to ensure the electric drive of the sailing vessel, or the accumulators must be charged at quays, which must perhaps be visited more often than normal just for charging the accumulators. In addition, this type of fixed-blade propeller brakes the passage of the sailing vessel when under sail, so that in practice the use of fixed-blade propellers in the traction devices of sailing vessel is not recommended.

Also known in the art are electrical propulsion arrangements for sailing vessels wherein the propeller blades of the traction device are folded backwards when the sailing vessel is traveling under the force of the sails. In this case the propeller hinders the forward movement of the sailing vessel as little as possible. A consequence of this, however, is that the propeller is not then very capable of gathering kinetic energy from the force of the movement of the sailing vessel when using the electric motor of the traction device as a generator. A type of propeller arrangement has, however, been developed as a solution to this, wherein the propeller blades are folded backwards during quite slow travel speeds, but the more the travel speed increases, the more the blades turn open from the effect of the centrifugal force produced by a faster speed of rotation, in which case the recovery of kinetic energy improves. This type of solution is used particularly in fast multihull sailing boats, because the sailing speed of single hull boats is too low for this type of solution.

Also known in the art are electrical propulsion arrangements for a sailing boat wherein the propeller blades of the traction device turn from the force of the flow into the direction of the flow. In this case the propeller hinders the travel motion of the sailing vessel when sailing as little as possible. When driving forwards the propeller blades settle into a predetermined position that enables reaching a sufficiently good efficiency ratio when driving forwards. Correspondingly, when driving in reverse the propeller blades settle, when changing the direction of rotation of the propeller shaft, approx. 180 degrees forwards from the drive position into a position that enables reaching an efficiency ratio that is essentially equal to when driving forwards. From the viewpoint of the functionality of the system, however, the shape of the propeller blades cannot be optimal in this solution. A consequence of this is that although this is, in practice, a functional and widely-used solution and kinetic energy recovery for charging the accumulators of a vessel is associated with it, the kinetic energy recovery is not so good in terms of its efficiency ratio that a sailing vessel could be fully self-sufficient with the accumulators charged by means of kinetic energy recovered during sailing journeys that are just the normal daily sailing trips in length.

In order to recover energy from the kinetic energy achieved by means of the sails at a sufficiently high efficiency ratio, the efficiency ratio of the propeller blades would have to be as good as possible also in the direction opposite to the normal drive direction. This requires a controllable pitch angle for the propeller blades. A controllable pitch angle for the propeller blades is known in the art from, inter alia, ship propellers in which the pitch angles of the blades are adjusted, e.g. between 0-60 degrees, for improving the efficiency ratio of forward movement. This type of adjusting movement is not, however, sufficient for using the propeller to rotate a generator, because the efficiency ratio of the propeller does not improve sufficiently in motion in a direction that is opposite to the normal movement direction. For this a propeller solution would be needed in which the adjustment angle of the blades would be at least 180 degrees, preferably even more than that. These types of effective propeller solutions that recover the kinetic energy of a sailing vessel in the traction devices of sailing vessels are not known in the art to exist.

A solution is, however, known from U.S. Pat. No. 5,554,003A wherein a blade pitch angle is mentioned that is at its maximum approx. 180 degrees. In this solution, however, the same shaft with which the propeller is rotated is used for adjusting the angle of the propeller blades. In the propeller hub is a stop mechanism, which limits the extreme positions of pitch angles between forward and reverse movement and also generator use to at least 120 degrees and preferably to approx. 180 degrees. When the direction is changed, the propeller shaft first rotates a part of a revolution without the propeller rotating. In this case the propeller shaft rotates from the first limit to the second limit of the stop mechanism, or vice versa. On this rotation the propeller shaft changes the pitch angle. When the detent of the propeller shaft reaches either extreme position limit, the pitch angle is correct for the next working motion and the propeller starts to operate in the opposite direction. These extreme positions function sufficiently well, but one problem is that the propeller blades do not remain in their correct attitude between the extreme positions, for example when it is desired to drive with free sailing and minimum friction without the propeller blades receiving resistance. Since the position of the pitch angles is not adjustable, but instead they adjust themselves between the extreme positions, the solution cannot be optimized e.g. from the viewpoint of the recovery of kinetic energy. In addition, from the viewpoint of the functionality of the system, the shape of the propeller blades cannot be optimal, so the solution of the aforementioned patent is not sufficiently good in terms of its efficiency ratio for adequately efficient charging of the accumulators of sailing vessels.

A solution is known from international patent publication no. WO2005012078A1 wherein the propeller is rotated on a hollow shaft, inside which is a push rod rotating along with the hollow shaft, which rod is moved axially either forwards or backwards for adjusting the pitch angles of the propeller. Inside the propeller hub is a lever mechanism for changing the axial movement of the push rod for adjusting the pitch angles into rotary movement. It is not, however, possible with the axial movement of the push rod to bring about such a large adjustment movement of the pitch angles that the propeller could be used at a sufficient efficiency ratio for rotating the motor as a generator. The magnitude of the adjustment of the pitch angles is not even mentioned in the publication. The purpose in the solution according to the WO publication is, in fact, only to adjust the pitch angles in such a way that forward travel is achieved as efficiently as possible.

Yet another solution is known from U.S. Pat. No. 3,795,463A, in which is a control for propeller blades intended for ships, wherein a separate multipart shaft controlling the blades is inside a hollow shaft that rotates the propeller. The controlling shaft is rotated with a servomotor from the end of the controlling shaft, the servomotor being fixed to the housing of a separate angular gearing unit, which gearing unit is connected to the second end of the propeller shaft to transmit rotational movement of the drive motor of the traction device to the propeller shaft. The drive shaft of the servomotor is connected via a complex gearing arrangement to a first extension of the controlling shaft extending from the second end of the propeller shaft, by rotating which extension a coupling means in the propeller hub on the second extension of the controlling shaft is moved in the axial direction for adjusting the pitch angles of the propeller blades. The problem here also is the axial movement of the controlling shaft, the axial movement not bringing about a pitch angle control movement that is large enough for forward travel, reverse travel and, particularly, rotation of the motor as a generator to be sufficiently efficient. For this reason the structure is unusable in electrical propulsion. One further problem is the complex structure of the gearing arrangement on the second end of the propeller shaft, that is made complex by, inter alia, the fact that the gearing structure must enable use of the servomotor fixed rigidly into position on the gearing housing without the servomotor rotating along with the propeller shaft during drive or reversing. Most of the gear wheels of the reduction gear always rotate, increasing the friction, reducing the efficiency ratio of charging and requiring splash lubrication. In addition, the structure has many parts that require servicing. This solution is not economically viable in leisure craft.

Known from Russian patent publication no. RU2236986C2 is a solution for controlling the pitch angles of propeller blades wherein inside the hollow propeller shaft is a pitch angle control rod, a servomotor and reduction gearing functioning as a reduction gear. The servomotor rotates the control rod in relation to the propeller shaft and the adjustment position of the blades is monitored with an electromechanical sensor suited to the purpose. The publication mentions that the servomotor is rigidly fixed inside the hollow propeller shaft, but the fixing solution is not described in more detail. The publication also does not describe the connection of the control shaft to the mechanism in the propeller hub for adjusting the propeller blades, nor the connection of the drive motor rotating the propeller shaft to the propeller shaft. In solutions known in the art the drive motor is generally at one of the two ends of the propeller shaft, which solution is not actually presented in this publication. It is to be assumed that in this solution also the drive motor is at the second end of the propeller shaft because there was no space there for the servomotor, which had to be disposed inside the propeller shaft. A problem is inter alia that gaining access to the servomotor that is inside the propeller shaft, e.g. when servicing or repair is needed, is difficult. In addition, installing the servomotor inside the propeller shaft is awkward and time-consuming. One further problem is that owing to the servomotor the propeller shaft must always be made disadvantageously large in diameter at least at the point of the servomotor and gearing. Another problem is the unfavorably long structure, particularly in an angular gearing application, because the motor, reduction gear and blade control are consecutive and in a straight line, i.e. in practice one on top of the other.

The aim of this invention is to eliminate the aforementioned drawbacks and to achieve a method and apparatus in an electric propulsion arrangement of a sailing vessel, in brief hereinafter a solution, in which it is possible to control the pitch angle of the propeller in such a way that the position of the blades is optimal in forward drive, in reverse and in free sailing as well as when using the electric motor of the traction device as a generator for charging the accumulators of the sailing vessel. Another aim is to achieve a solution in which it is possible to recover as much energy as possible from the kinetic energy of the travel motion achieved by means of the sails for charging the accumulators of the sailing vessel at a good efficiency ratio. Another aim is to make the recovery of the kinetic energy of travel motion obtained by means of the sails so effective that a sailing vessel can be self-sufficient in relation to charging the accumulators also when only resorting to the charging energy collected during sailing sessions of normal duration. The method according to the invention in an electric propulsion arrangement of a sailing vessel is characterized by what is disclosed in the characterization part of claim 1. Correspondingly the apparatus according to the invention is characterized by what is disclosed in the characterization part of claim 5. Other embodiments of the invention are characterized by what is disclosed in the other claims.

One advantage of the solution according to the invention is the capability of recovering the kinetic energy of the travel motion of a sailing vessel achieved by means of the sails with such a good efficiency ratio that with sailing sessions of normal duration the sailing vessel can be self-sufficient in terms of electricity usage, because the accumulators of sailing vessels can be fully charged with even short sailing sessions when the sailing vessel travels by means of the sails. Another advantage is the easy and flexible, and also optimal, adjustment of the propeller blades also for other purposes than just charging the accumulators, i.e. as a result of the solution according to the invention optimal thrust is enabled in forward drive and in reversing, optimal free running is achieved, and also optimal generation of charging current is achieved when using the electric motor of the traction device as a generator during sailing. Another advantage is also the easy installation and service-friendliness of a servomotor that is at the end of the propeller shaft on the outside of the shaft. One advantage is also a simple and operationally reliable structure that is advantageous in terms of costs.

Figure 2:
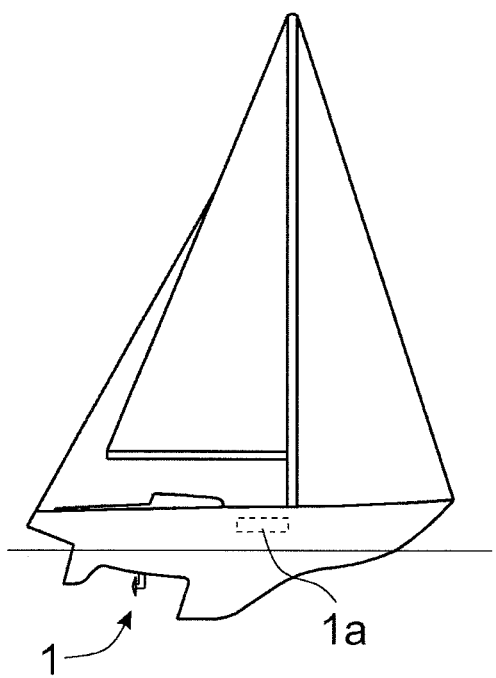
Figure 3:
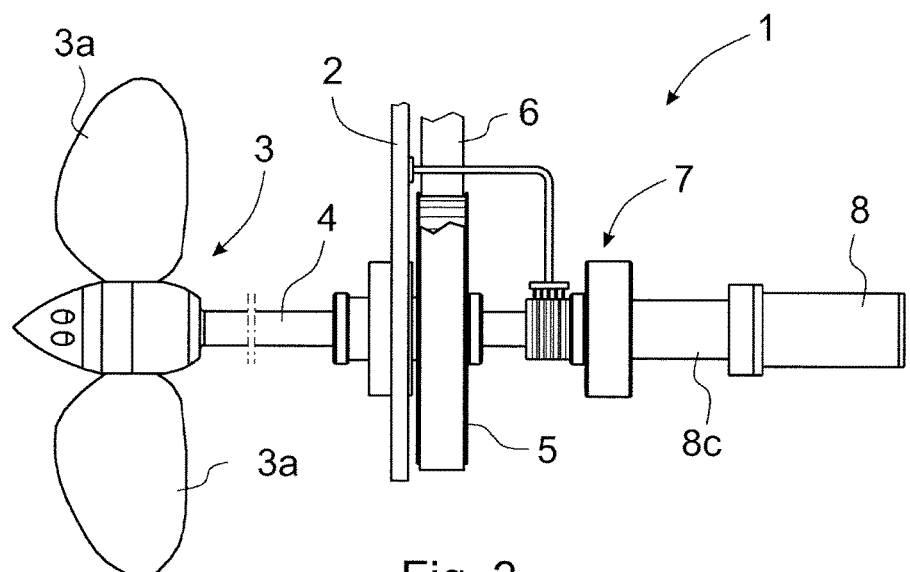

In the following, the invention will be described in greater detail by the aid of some embodiments and by referring to the attached simplified drawings, wherein FIG. 1 presents a simplified side view of one sailing boat provided with a typical traction device, FIG. 2 presents a simplified side view of a sailing boat provided with a another type of traction device, FIG. 3 presents a simplified and partially sectioned side view, shortened in length, of one propeller shaft with fittings, according to the invention, of a traction device of a sailing boat.

Figure 4:
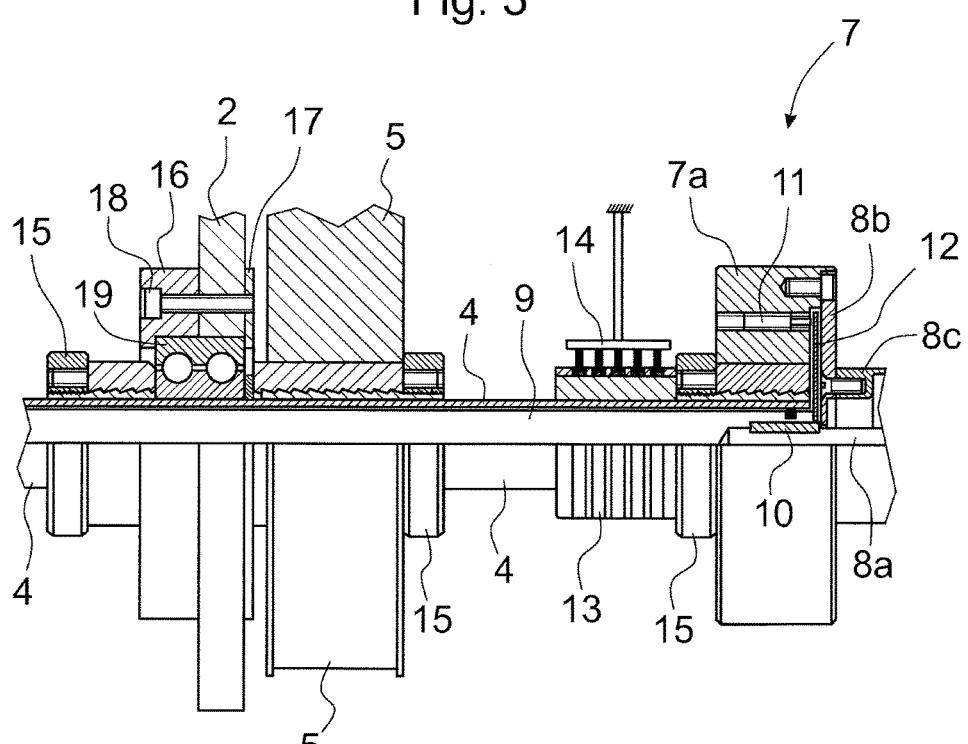
Figure 5:
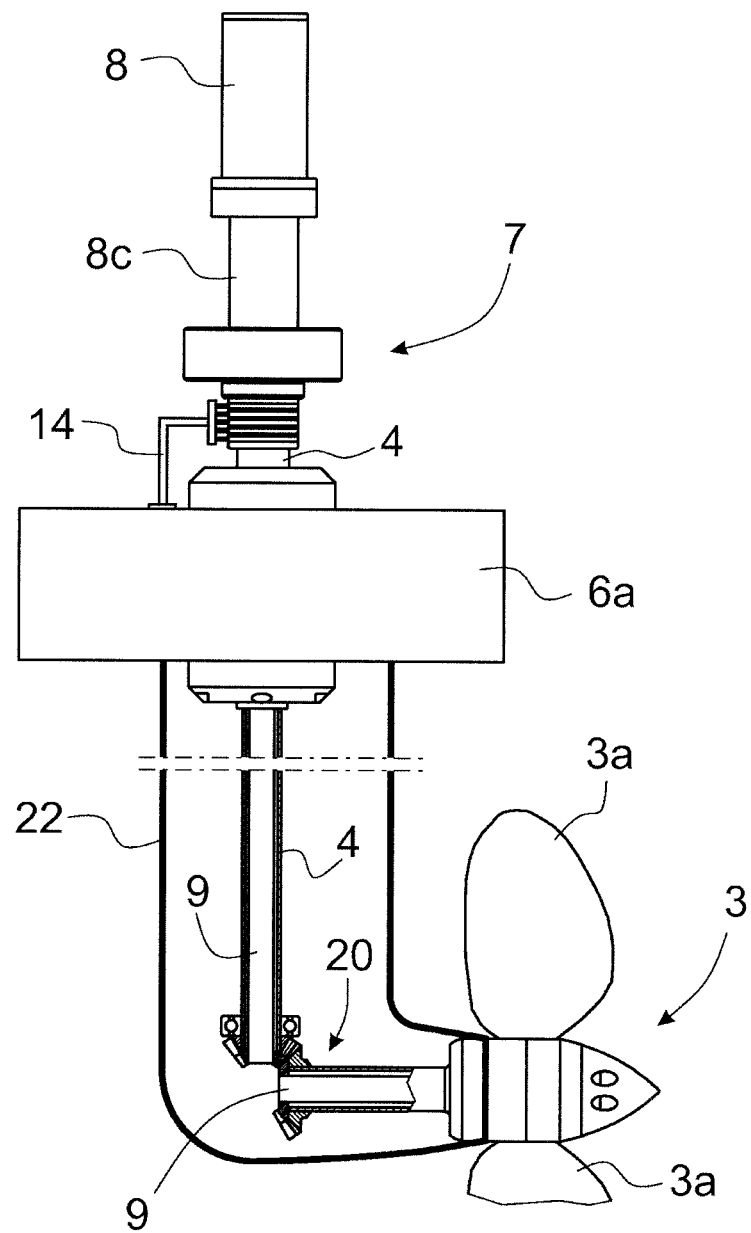
Figure 6:
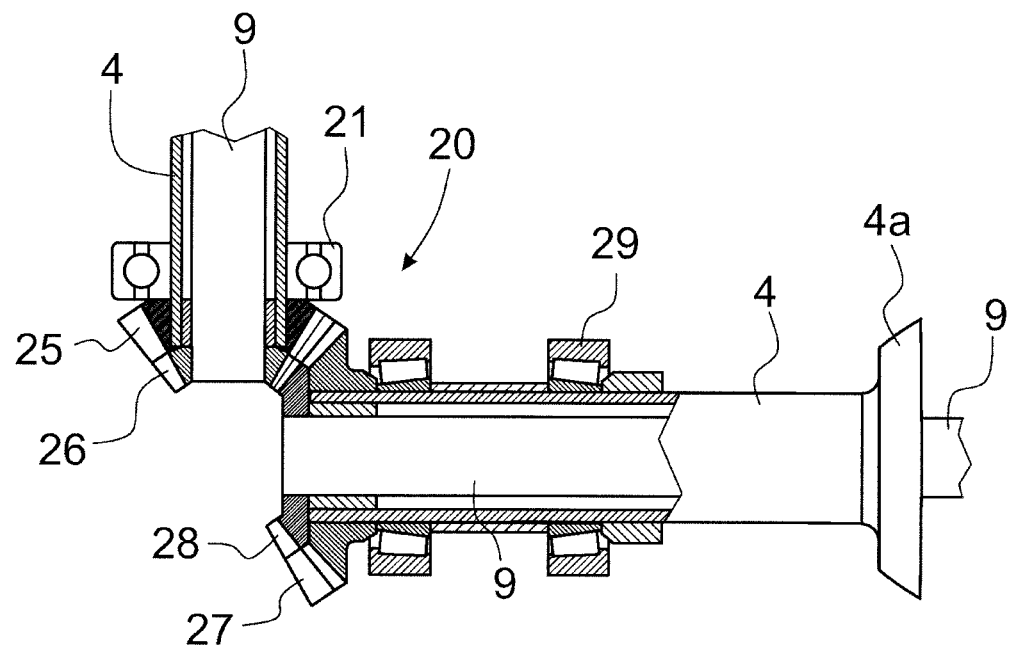
Figure 7:
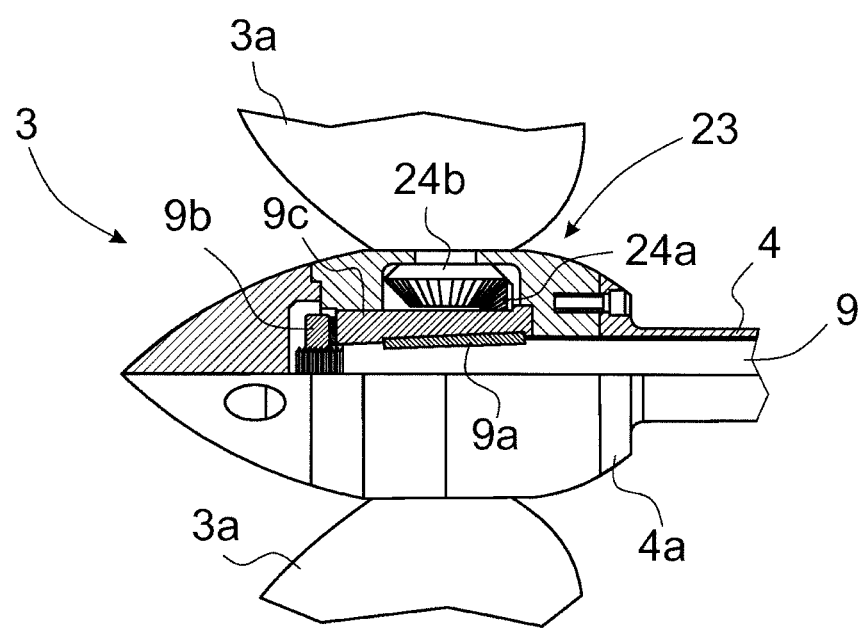

FIG. 4 presents a simplified, partially cross-sectioned and magnified side view of a part of a propeller shaft with fittings, according to FIG. 3, of a traction device of a sailing boat, FIG. 5 presents a simplified and partially sectioned side view, shortened in length, of one second traction device, according to the invention, of a sailing boat, wherein the propeller shaft is of two parts in such a way that the bottom part forms a 90-degree angle in relation to the top part, FIG. 6 presents a simplified, partially sectioned and magnified side view of the shaft arrangement of the bottom part of the traction device according to FIG. 5, and FIG. 7 presents a simplified, partially cross-sectioned and magnified side view of one propeller hub of a traction device of a sailing boat.

FIGS. 1 and 2 present a side view of a sailing boat, in which is a traction device that is partly inside the hull, the propeller mechanism 1 of which device is under the bottom of the boat. The traction device has e.g. an electric motor disposed inside the hull of the sailing boat, which motor is driven with the accumulators of the sailing boat, if necessary, for forward drive and also for reverse drive. In addition, the sailing boat is provided with an apparatus 1a for recovering the kinetic energy of the sailing boat when the boat is traveling by means of the sails and the travel motion rotates, via the propeller mechanism 1, the electric motor as a generator. The kinetic energy recovery apparatus 1a comprises, in addition to the propeller mechanism 1 and electric motor, at least a control system, an adjustment system and a set of accumulators comprising one or more rechargeable accumulators.

FIG. 3 presents a simplified and partially sectioned side view of one propeller mechanism 1 of a traction device of a sailing boat, the mechanism comprising e.g. a propeller hub 3 with propeller blades 3a and a hollow shaft 4 rotating the hub 3, which shaft is fixed at its first end to the hub 3, and to which propeller shaft 4 a belt wheel 5 or corresponding transmission means is fixed between the ends of the propeller shaft 4, which transmission means transfers the rotational movement of the electric motor of the traction device to the propeller shaft 4. The propeller mechanism 1 is fixed to the frame 2 of the traction device of the sailing boat, which frame 2 can be a plate-type element or e.g. an enclosure-type element. The propeller shaft 4 is rotated with the electric motor of the traction device disposed inside the hull of the sailing boat, e.g. via a toothed belt 6 and a belt wheel 5. The electric motor is not presented in the drawings. Instead of a toothed belt 6 and a belt wheel 5 also a direct-drive motor can be used, in which case the propeller shaft 4 is fixed inside the hollow rotor shaft of the direct-drive motor between the ends of the propeller shaft 4 in such a way that the servomotor 8, as described hereinafter, can be disposed on the second end of the propeller shaft 4.

An actuator, such as a reduction gear 8c, such as a servomotor 8 provided with a planetary gear, adjusting the pitch angles of the propeller blades 3a is fixed via a coupling mechanism 7 to the second end of the propeller shaft 4, which servomotor is connected to rotate along with the propeller shaft 4 in the direction of rotation of the shaft 4. A control shaft 9 concentric with the shaft 4 is inside the hollow shaft 4 of the propeller, said control shaft being described in more detail in conjunction with the descriptions of the figures hereinafter. The control shaft 9 is connected at its first end to a pitch angle adjustment mechanism in the propeller hub 3 and at its second end to the drive shaft 8a of the reduction gear 8c of the servomotor 8, the drive shaft rotating the control shaft 9 around its center axis inside the hollow shaft 4 of the propeller. The reduction gear 8c reduces the speed of rotation of the drive shaft 8a in such a way that the control shaft 9 rotates, rotated by the servomotor 8, in the speed of rotation range of approx. 2-40 rpm, e.g. in the range of 5-20 rpm, suitably in the range of 8-12 rpm and preferably e.g. at the revolutions per minute speed of N, where N has e.g. the values 8, 10, 11 and the decimal values between them.

FIG. 4 presents a simplified, partially sectioned and magnified side view of a part of a propeller shaft 4, with fittings, of the traction device of a sailing boat. As stated above, the shaft 4 of the propeller is hollow and inside it is a control shaft 9, which is fixed at its 10 second end via a wedge 10 to the drive shaft 8a of the reduction gear 8c of the servomotor 8.

The coupling mechanism 7 on the second end of the propeller shaft 4 comprises a ring-shaped coupling means 7a, which is fixed to the second end of the shaft 4 by means of a locking means 15, such as a locking bushing, or directly fixed to the belt wheel or some other power transmission wheel 5 in such a way that the coupling means 7a is not able to move in the axial or radial directions in relation to the shaft 4. The fixing flange 8b on the frame of the reduction gear 8c of the servomotor 8 is fixed to the end of the coupling means 7a by means of fixing screws. Inside the coupling means 7a is a sensor arrangement, which comprises e.g. a disc-shaped positioning flange 12 and a position sensor 11 detecting the position of the positioning flange 12, which sensor is connected to the control system of the kinetic energy recovery apparatus 1a. The positioning flange 12 is adapted to rotate via a wedge 10 along with the control shaft 9. In this way the angular position of the control shaft 9 is detected with the sensor arrangement and, on the basis of the angular position, the adjustment position of the pitch angles of the propeller blades 3a. The adjustment position detection data measured with the position sensor 11 and sent to the control system of the kinetic energy recovery apparatus 1a is sent onwards from the control system, as control data and position change data, to the servomotor 8 for changing the adjustment position, until the desired adjustment position has been achieved.

The propeller shaft 4 is mounted on a bearing 19 to the frame 2 of the traction device, which bearing 19 is in a bearing housing, which is composed of a first ring-shaped half 16 and a second ring-shaped half 17, which are fixed to each other with fixing means 18, such as screws, through a bracket element 2. The bearing housing is locked into its position in the axial direction on the shaft 4 of the propeller by means of locking means 15, such as retainer bushings. Also the belt wheel 5 is locked into its position in the axial direction on the shaft 4 of the propeller by means of the locking means 15. Alternatively, the shaft 4 of the propeller is fixed in a direct drive motor onto the hollow rotor shaft of the electric motor of the traction device.

The propeller mechanism 1 further comprises a slip-ring stack 13 fixed onto the propeller shaft 4 to rotate along with the shaft 4, and brushes 14 or corresponding elements on the slip rings, which brushes are fixed e.g. to the bracket element 2 or to some other suitable location. The servomotor 8 and sensor 11 are connected to the electrical system and to the control system of the kinetic energy recovery apparatus 1a of the boat via the slip-ring stack and brushes 14 or corresponding transmission arrangement.

FIG. 5 presents a simplified and partially sectioned side view of one second traction device of a sailing boat, the traction device having a kinetic energy recovery arrangement, according to the invention, for a sailing boat. Only the top end and bottom end of the traction device are seen in the figure, because a part of the vertical shaft and body 22 is cut away. In addition, the body 22 is presented diagrammatically and for the sake of clarity parts are omitted from inside the body. In this solution there is a direct drive motor, such as an electric motor 6a, instead of a belt wheel 5, the electric motor rotating the hollow shaft of the propeller, which shaft is now disposed to travel through the electric motor 6a in the same way as it travels through the belt wheel 5 in the solution presented by FIG. 3. Instead of an electric motor 6a, in this solution there could also be a belt wheel on the propeller shaft 4, in which case the actual electric motor would be farther away.

The propeller shaft 4 and the control shaft 9 inside it are, in this solution, divided into two parts, the first of which, i.e. the upper part, is essentially vertical when the traction device is in its drive position, and the second, i.e. lower part is at a right angle to the first part. The first and second parts of the shafts 4 and 9 are connected to each other with a bevel gear transmission 20 that is an angular gear in such a way that when driving with the traction device the first part of the propeller shaft 4 rotates the second part of the propeller shaft 4 and the first part of the control shaft 9 rotates the second part of the control shaft 9. Correspondingly, when using the electric motor of the traction device as a generator, the second part of the propeller shaft 4 rotates the first part of the propeller shaft 4 and the second part of the control shaft 9 rotates the first part of the control shaft 9.

On the second end of the first part of the propeller shaft 4, i.e. on the free end or on the top end, is a similar coupling mechanism 7 and servomotor 8 with slip-rings 13 as in the solution according to FIG. 3. The servomotor 8 is attached to the first end of the second part of the propeller shaft 4, in the same way as in the solution according to FIGS. 3 and 4. Likewise the servomotor 8 and the position sensor 11 of the control shaft 9 are connected to the electrical system and control system of the kinetic energy recovery apparatus 1a of the boat in the same way as in the solution according to FIGS. 3 and 4.

The biggest difference with respect to the solution according to FIGS. 3 and 4 is the division of the shafts 4 and 9 into two parts. FIG. 6 presents in more detail a magnified view of the shaft arrangement of the bottom part of the traction device according to FIG. 5 at the point of the bevel gear transmission 20. On the first end, i.e. on the bottom end, of the first part of the propeller shaft 4 is a bevel gear 25 that is connected to mesh with a bevel gear 27 that is on the second end of the second part of the propeller shaft 4. Correspondingly, on the first end, i.e. on the bottom end, of the first part of the control shaft 9 is a bevel gear 26 that is connected to mesh with a bevel gear 28 that is near the second end of the second part of the control shaft 9. The first end of the second part of the propeller shaft 4 is fixed to the propeller hub 3 by means of a fixing flange 4a and the first end of the control shaft 9 is fixed to the pitch angle adjustment mechanism 23 that is in the propeller hub 3, the adjustment mechanism being described in more detail in connection with FIG. 7. The first end of the first part of the propeller shaft 4 is mounted on a bearing to the frame 22 of the traction device by means of the bearing 21, and the second part is mounted on a bearing to the frame 22 of the traction device by means of the bearing 29. Correspondingly, the second end of the second part of the control shaft 9 is mounted via a sliding bearing inside the second end of the second part of the propeller shaft 4, and the first end, i.e. the bottom end, of the first part of the control shaft 9 is mounted via a sliding bearing inside the first end, i.e. the bottom end, of the first part of the propeller shaft 4.

FIG. 7 presents a partially cross-sectioned and magnified view of one propeller hub 3, according to the invention, of a traction device of a sailing boat. The hub 3, and its components, can be similar in both the traction drive applications presented, and generally in all the traction drive solutions according to the present invention. Likewise the propeller and its hub 3 can be any commercially available propeller whatsoever. In any reference in the description of FIG. 7 hereinafter, the propeller shaft 4 or control shaft 9 refers also to the second part, i.e. bottom part, of the propeller shaft and control shaft of the solution according to FIG. 5. The propeller shaft 4 is fixed to the hub 3 of the propeller by means of a fixing flange 4a in such a way that when the propeller shaft 4 rotates, the propeller hub 3 rotates along with the shaft 4.

The first end of the control shaft 9 is connected to the adjustment mechanism 23 of the propeller blades 3a, which mechanism is inside the hub 3 and comprises e.g. a locking ring 9c of the control shaft 9, a first bevel gear 24a on the first end of the control shaft 9 and a bevel gear 24 on each fixing arm of a propeller blade 3a, the bevel gear 24 being disposed inside the hub 3, which bevel gears 24a and 24b function as an angular gear. The first end of the control shaft 9 is locked to be immobilized in the axial direction inside the hub 3. On the first end of the control shaft 9 is a thread for the locking, on which thread is a locking nut 9b, which is adapted to press the locking ring 9c inside the hub 3 in such a way that the control shaft 9 is not able to move in the axial direction in relation to the hub 3.

The first bevel gear 24a belonging to the adjustment mechanism 23 for the pitch angles is fixed onto the locking ring 9c, which is in turn locked to rotate along with the control shaft 9 via a wedge 9a. Thus the bevel gear 24a also rotates along with the rotational movement of the control shaft 9. The second bevel gear 24b that is on the fixing arm of each blade 3a of the propeller and is disposed inside the hub 3 meshes with the bevel gear 24a that is on the end of the control shaft 9 in such a way that when rotating the control shaft 9 inside the propeller shaft 4, the pitch angle of all the blades 3a changes at the same time and by the same amount, between 0-360 degrees, depending on the angle of rotation or number of rotations of the control shaft 9.

With the solution according to the invention it is therefore possible to adjust the pitch angle of the propeller blades 3a more than in solutions that are known in the art. For achieving a sufficiently good efficiency ratio in the recovery of kinetic energy, the pitch angles of the propeller blades 3a are adjusted in the solution according to the invention with the servomotor 8 approx. 120-270 degrees, e.g. approx. 180-220 degrees, suitably between 190-210 degrees and preferably approx. 200 degrees. The adjustment angles of the blades 3a are thus optimized with the solution according to the invention separately and, if necessary, both for forward drive and for reverse drive as well as for free sailing, in which case the propeller resistance is as small as possible, and finally for recovery of the kinetic energy of the sailing boat, in which case the pitch angles of the propeller blades 3a are adjusted in such a way that the efficiency ratio of kinetic energy recovery is as high as possible.

In this case the kinetic energy of the sailing boat is recovered with the recovery arrangement according to the invention with an efficiency ratio whereby the amount of energy being charged into the accumulators of the sailing boat during a sailing journey of normal duration is at least equal to, or greater than, the amount of electrical energy needed by the sailing boat during a sailing journey of normal duration. The accumulators of the sailing boat can thus be fully charged during a sailing journey of normal duration. In this way a sailing vessel can function also for long periods of time fully self-sufficiently when receiving the electrical energy it needs for recharging accumulators via the electric motor of the traction device when moving by means of the sails.

It is obvious to the person skilled in the art that different embodiments of the invention are not only limited to the examples described above, but that they may be varied within the scope of the claims presented below. Thus, for example, the adjustment mechanism that is inside the propeller hub can also be different to what is presented in the preceding. In this case, instead of the bevel gear transmission, there can be some other type of gear transmission mechanism or a completely other type of mechanism, which transfers the rotational movement of the control shaft into a movement adjusting the pitch angle of the propeller blades.

It is further obvious to the person skilled in the art that the mechanism for connecting the servomotor to the shaft of the propeller can also be different to what is presented in the preceding. A good point from the viewpoint of the simplicity of the construction is, however, that the servomotor is fixed as simply as possible to the propeller shaft, in which case it rotates along with the propeller shaft, and that the control shaft rotated by the servomotor rotates when adjusting the pitch angle inside the hollow propeller shaft in relation to the rotational movement of the propeller shaft itself. In this case the servomotor that is fixed to the second end of the propeller shaft and rotates along with the shaft changes the radial interpositioning of the control shaft and the propeller shaft, thus changing the position of the propeller blades fixed to the first end of the propeller shaft.

It is further obvious to the person skilled in the art that instead of an electric servomotor being the actuator for adjusting the blades, the actuator can also be a hydraulic or pneumatic actuator, or even a mechanical actuator.

It is also obvious to the person skilled in the art that instead of toothed-belt gearing, also other power transmission solutions can be used between the shaft and the propulsion motor, such as V-belt transmission and gear wheel transmission.

It is also further obvious to the person skilled in the art that the propeller can also have, instead of the two blades presented, a number of controllable blades, e.g. 3, 4, 5, 6 or even more.

The invention claimed is:

1. A method in an electric propulsion arrangement of a sailing vessel, wherein the sailing vessel has a traction device provided with an electric motor and with a propeller mechanism, the electric motor of which traction device being usable in forward drive and reverse drive, the electric motor further being usable as a generator during sailing, for charging one or more accumulators of the sailing vessel, and wherein the propeller mechanism of the traction device includes a propeller hub with a plurality of propeller blades being adjustably positioned to plural pitch angles, a hollow propeller shaft fixed at a first end to the propeller hub, having a center axis, and a second end, a control shaft having an adjustable position and controlling the pitch angles of the propeller blades being inside the propeller shaft, and an actuator actuating the control shaft, the method comprising:
   changing the position of the control shaft in relation to the propeller shaft, and in which method the propeller shaft is supported and rotated around its center axis from a section between the first and the second end of the propeller shaft,
   adjusting the pitch angles of the propeller blades by control of the actuator, the actuator being fixed to the second end of the propeller shaft to be rotatable along with the propeller shaft by rotating the control shaft inside the propeller shaft in relation to the propeller shaft.

2. The method according to claim 1, wherein the pitch angles of the propeller blades are adjusted between 0-360 degrees via the adjustment mechanism in the propeller hub by rotating the control shaft by means of the actuator inside the propeller shaft, and in that when using the electric motor of the traction device as a generator the pitch angle of the propeller blades is adjusted with the actuator to an adjustment angle that is between 120-270 degrees.

3. The method according to claim 2, wherein the adjustment position of the pitch angles of the propeller blades is measured with a position sensor, the adjustment position identification being data provided to a control system of a recovery apparatus for kinetic energy of the sailing vessel, said apparatus being in the sailing vessel.

4. The method according to claim 2, wherein the pitch angles of the propeller blades are separately optimized by the actuator fixed to the propeller shaft for a) forward drive, b) reverse drive, c) free sailing, in which case resistance to water flow imparted by the propeller mechanism is as small as possible, and d) for recovery of the kinetic energy of the sailing boat, in which case the pitch angles of the propeller blades are adjusted in such a way that the efficiency ratio of kinetic energy recovery is as high as possible and the amount of the capacity of the kinetic energy recovered and being charged into the accumulators of the sailing vessel during a sailing journey of normal duration is at least equal to, or greater than, the amount of electrical energy needed by the sailing boat during a sailing journey of normal duration.

5. The method of claim 2 wherein the adjustment angle is 180-220 degrees.

6. The method of claim 5 wherein the adjustment angle is between 190 and 210 degrees.

7. The method according to claim 1, wherein the adjusting of the pitch angles of the propeller blades is measured with a position sensor that produces adjustment position identification data, the adjustment position identification data being delivered to a control system of a recovery apparatus for kinetic energy of the sailing vessel, said apparatus being provided in the sailing vessel.

8. The method according to claim 7, wherein the pitch angles of the propeller blades are separately optimized by the actuator fixed to the propeller shaft for a) forward drive, b) reverse drive, c) free sailing, in which case resistance to water flow imparted by the propeller mechanism is as small as possible, and d) for recovery of the kinetic energy of the sailing boat, in which case the pitch angles of the propeller blades are adjusted in such a way that the efficiency ratio of kinetic energy recovery is as high as possible and the amount of the capacity of the kinetic energy recovered and being charged into the accumulators of the sailing vessel during a sailing journey of normal duration is equal to, or greater than, the amount of electrical energy needed by the sailing boat during a sailing journey of normal duration.

9. An electric propulsion apparatus of a sailing vessel, wherein the sailing vessel includes a traction device provided with an electric motor and a propeller mechanism, the electric motor of the traction device being arranged to be usable, in forward drive, reverse drive and as a generator during sailing for charging one or more accumulators of the sailing vessel, the propeller mechanism of the traction device comprising:
- a propeller hub with a plurality of propeller blades being adjustably positioned to plural pitch angles,
- a hollow propeller shaft fixed at a first end to the propeller hub, and having a center axis, and a second end,
- a control shaft controlling the pitch angles of the propeller blades, said control shaft being positioned inside the propeller shaft, and
- an actuator, having a drive shaft and changing the position of the control shaft in relation to the propeller shaft,
- wherein the propeller shaft is supported and arranged to be rotatable around its center axis between the first and the second end of the propeller shaft, wherein the actuator is fixed to the second end of the propeller shaft to be rotatable along with the propeller shaft and the drive shaft of the actuator is connected to the second end of the control shaft to move the control shaft in relation to the shaft of the propeller.

10. The apparatus according to claim 9, wherein the first end of the control shaft is disposed inside the hub of the propeller and locked to be immobilized in the axial direction in relation to the hub, and the end of the control shaft is connected to the drive shaft of the actuator inside the second end of the hollow shaft of the propeller, the speed of rotation of which drive shaft is reduced by means of a reduction gear, connected to the actuator, for adjusting the pitch angles of the propeller blades.

11. The apparatus according to claim 10, wherein inside the propeller hub includes an adjustment mechanism for controlling the pitch angles of the blades, with which mechanism the pitch angle of the blades is arranged to be adjusted between 0-360 degrees by rotating the control shaft by means of the actuator, and in that when using the electric motor of the traction device as a generator the pitch angle of the blades is adjusted to be between 120-270.

12. The apparatus according to claim 11, wherein the adjustment mechanism for the pitch angles of the blades comprises a first bevel gear fixed to the first end of the control shaft and a second bevel gear fixed to the fixing shaft of each blade, the second bevel gear meshing with the first bevel gear.

13. The apparatus according to claim 10, further comprising a position sensor detecting the pitch angles of the propeller blades being adjusted with the actuator, the position sensor being adapted to rotate along with the propeller shaft, the actuator and position sensor being connected to an electric system of the sailing vessel and to a control system of a recovery apparatus for kinetic energy of the sailing vessel via a transmission arrangement.

14. The apparatus according to claim 9, wherein inside the propeller hub is further provided an adjustment mechanism for controlling the pitch angles of the blades, with which mechanism the pitch angle of the blades is arranged to be adjusted between 0-360 degrees by rotating the control shaft by means of the actuator, and in that when using the electric motor of the traction device as a generator the pitch angle of the blades is adjusted to be between 120-270 degrees.

15. Apparatus according to claim 14, further comprising a position sensor detecting the pitch angles of the propeller blades being adjusted with the actuator, the position sensor being adapted to rotate along with the propeller shaft, the actuator and position sensor are connected to an electric system of the sailing vessel and to a control system of a recovery apparatus for kinetic energy of the sailing vessel via a transmission arrangement.

16. The apparatus of claim 14 wherein the adjustment angle is 180-220 degrees.

17. The apparatus of claim 16 wherein the adjustment angle is between 190 and 210 degrees.

18. The apparatus according to claim 9, wherein the adjustment mechanism for the pitch angles of the blades comprises a first bevel gear fixed to the first end of the control shaft and a second bevel gear fixed to the fixing shaft of each blade, the second bevel gear meshing with the first bevel gear.

19. Apparatus The apparatus according to claim 9, further comprising
- a position sensor detecting the pitch angles of the propeller blades being adjusted with the actuator, the position sensor being adapted to rotate along with the propeller shaft, the actuator and position sensor being connected to an electrical system of the sailing vessel and to a control system of a recovery apparatus for the kinetic energy of the sailing vessel via a transmission arrangement.

20. The apparatus according to claim 9, wherein both the hollow shaft as well as the control shaft inside it are each divided into a first part and a second part, which parts are connected to each other with a bevel gear transmission in such a way that on the first end of the first part of the propeller shaft is a bevel gear that is connected to mesh with a bevel gear that is on the second end of the second part of the propeller shaft, and correspondingly on the first end of the first part of the control shaft is a bevel gear that is connected to mesh with a bevel gear that is on the second part of the control shaft.

* * * * *